US008218338B2

(12) United States Patent
Lin

(10) Patent No.: US 8,218,338 B2
(45) Date of Patent: Jul. 10, 2012

(54) HIGH EFFICIENCY UNIVERSAL INPUT SWITCHING POWER SUPPLY

(75) Inventor: Wei-Liang Lin, Taipei Hsien (TW)

(73) Assignee: Acbel Polytech Inc., Tamshui Chen, Taipei Hsien (TW)

( * ) Notice: Subject to any disclaimer, the term of this patent is extended or adjusted under 35 U.S.C. 154(b) by 410 days.

(21) Appl. No.: 12/631,647

(22) Filed: Dec. 4, 2009

(65) Prior Publication Data

US 2010/0165668 A1 Jul. 1, 2010

(30) Foreign Application Priority Data

Dec. 26, 2008 (TW) .............................. 97151162 A
Apr. 15, 2009 (TW) .............................. 98112442 A

(51) Int. Cl.
*H02M 3/332* (2006.01)
(52) U.S. Cl. .......................... 363/17; 363/132; 323/266
(58) Field of Classification Search ............. 363/16–20, 363/21.01, 21.04, 21.06, 21.14, 40, 56.01, 363/65–67, 98, 131, 132, 34; 323/224, 266–268, 323/271–274, 282–285; 315/297, 307
See application file for complete search history.

(56) References Cited

U.S. PATENT DOCUMENTS

| 5,483,436 | A | * | 1/1996 | Brown et al. | 363/98 |
| 6,246,599 | B1 | * | 6/2001 | Jang et al. | 363/132 |
| 6,583,999 | B1 | * | 6/2003 | Spindler et al. | 363/98 |
| 6,970,366 | B2 | * | 11/2005 | Apeland et al. | 363/132 |
| 7,009,853 | B2 | * | 3/2006 | Nagel et al. | 363/17 |
| 7,969,752 | B2 | * | 6/2011 | Bong et al. | 363/17 |
| 2010/0097826 | A1 | * | 4/2010 | Xu et al. | 363/17 |

* cited by examiner

*Primary Examiner* — Rajinikant Patel
(74) *Attorney, Agent, or Firm* — patenttm.us

(57) ABSTRACT

A universal input switching power supply has the rectifier, a signal detecting unit detecting a voltage of an external AC power and outputting a detecting signal, a PFC circuit converts a first DC power from the rectifier to a second DC power with different voltage according to the detecting signal; and a parallel and serial type DC to DC converter converting the second DC power with different voltage to a constant voltage of the third DC power. The parallel and serial type DC to DC converter has a transformer having a primary and secondary coils and physically changes a turn ratio of the primary and secondary coils of a transformer thereof according to a voltage ratio of the second DC power and the third DC power. Accordingly, the universal input switching power supply has good transforming efficiency at different AC power source conditions.

20 Claims, 15 Drawing Sheets

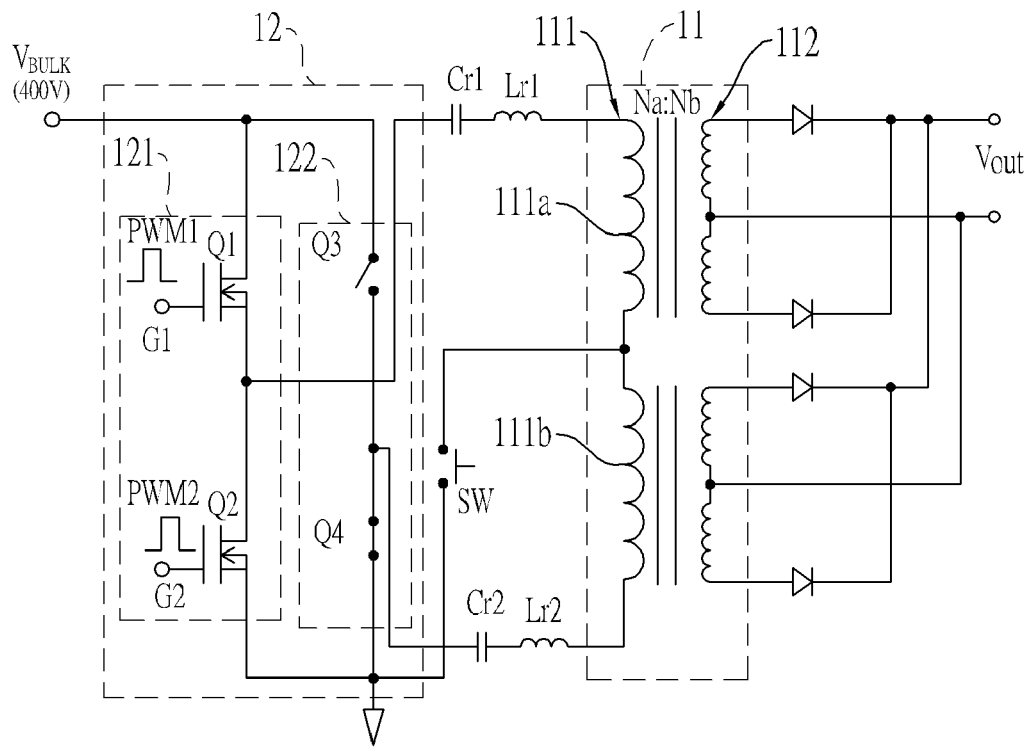
FIG. 4A
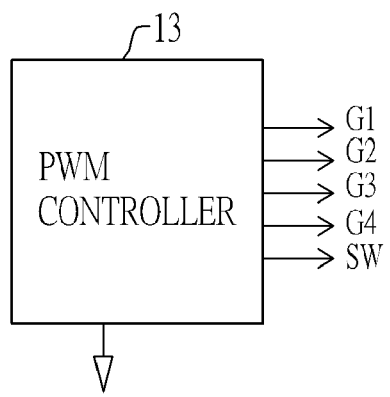

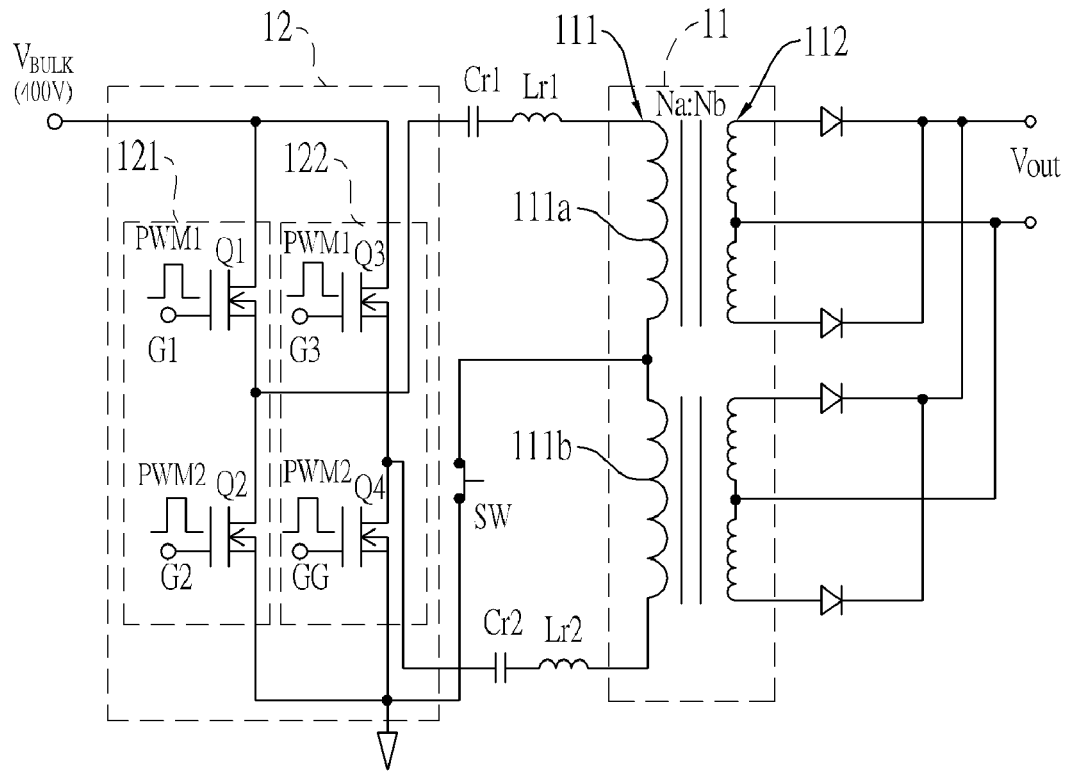
FIG. 4B
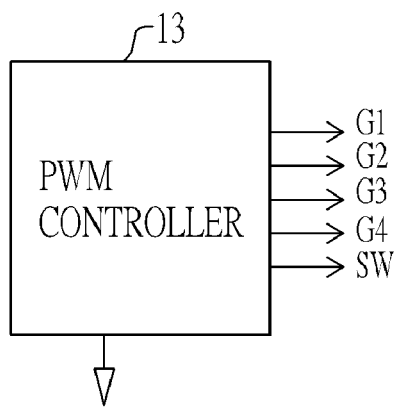

US 8,218,338 B2

HIGH EFFICIENCY UNIVERSAL INPUT SWITCHING POWER SUPPLY

BACKGROUND OF THE INVENTION

1. Field of the Invention

The present invention is related to a universal input switching power supply, and more particularly to a universal input switching power supply having a parallel and serial type DC to DC converter to increase transforming efficiency.

2. Description of the Related Art

The universal input switching power supply may use a high line voltage range (185V to 265V) of an AC power source or a low line voltage range (90V to 130V) of an AC power source and provides a constant output voltage of a DC power source. Every country sets a normal high and low line voltages of the AC power, for example, in Taiwan, the normal high line voltage is 220 VAC and the normal low line voltage is 110 VAC.

With reference to FIG. 11, a conventional universal input switching power supply mainly has a full bridge rectifier (50), a power factor corrector (hereinafter PFC) circuit (51) and a DC to DC converting circuit (52). The full bridge rectifier (50) is coupled to the external AC power source (AC IN) and converts the AC power source (AC IN) to a first DC power source. Since the PFC circuit (51) is connected to the full bridge rectifier (50), a voltage of the first DC power source is boosted to a second DC power source ($V_{bulk}$) with higher voltage if the PFC circuit (51) uses a structure of a boost converter. On the contrary, the voltage of the first DC power is decreased when the PFC circuit (51) uses a structure of a buck converter. Using the boost converter as the PFC circuit (51) for an example, a PFC controller (511) of the PFC circuit (51) drives a power switch (S1) to turn on or off by outputting a PWM signal. The voltage of the second DC power source from the PFC circuit (51) will be close to 400V. The 400V of the voltage of the second DC power source is further supplied to the DC to DC converting circuit (52). A PWM controller (521) of the DC to DC converting circuit (52) outputs a PWM signal to a power switch (S2) to adjust current value of a primary side of a transformer (522). Pulse widths of the PWM signal from the DC to DC converting circuit (52) is modulated according to an output voltage ($V_O$) of the universal input switching power supply. Therefore, the DC to DC converting circuit (52) stabilizes the output voltage ($V_O$) of the universal input switching power supply at different voltages of the AC power source conditions.

The PFC circuit (51) of the above universal input switching power supply outputs 400V of the voltage of the second DC power source to the DC to DC converting circuit (52) when the universal input switching power supply is coupled to 220V AC power source (AC IN). Therefore, the DC to DC converting circuit (52) converts the 400V of the voltage of the second DC power source to a 12V or 5V of a voltage of a third DC power source. However, a transforming efficiency of the universal switching power is not good, especially coupling to 110V AC power source (AC IN). That is, the PFC circuit (51) has to converts the 220V or 110V of the voltage of the AC power source to 400V DC power source ($V_{bulk}$). In general, the PFC controller (51) using the structure of the boost converter has about 96% transforming efficiency at using 220V AC power source condition. However, the PFC controller (51) modulates a large pulse width of the PWM signal to the power switch (S1) to output 400V DC power source when the universal input switching power supply is coupled to the 110V AC power supply. Therefore, a conductive term of the power switch (S1) is increased, a conductive resistor of the power switch (S1) consumes more energy of the AC power source.

Accordingly, an transforming efficiency of the PFC circuit (51) coupled to the 110V AC power source is decreased to about 94% that is lower than that of the PFC circuit coupled to the 220V AC power source.

Another type of the universal input switching power supply, a PFC circuit uses a structure of a buck converter. The PFC circuit outputs 80V of the voltage of the second DC power source to a DC to DC converting circuit. A transformer of the DC to DC converting circuit is smaller than that of the above DC to DC converting circuit for boost converter. Therefore, the universal switching power efficiency is also not good, especially coupling to the high voltage of the AC power source. In general, the PFC circuit has to convert the 220V or 110V of the voltage of the AC power source to 80V of the DC power source through the full bridge rectifier. The PFC controller using the structure of the buck converter has 96% transforming efficiency at using 110V AC power source condition. On the contrary, an transforming efficiency of the PFC circuit coupled to the 220V AC power source is about 94% and is lower than that of the PFC circuit coupled to the 110V AC power source.

Based on foregoing description, each of the universal switching power supplies can not provide good transforming efficiency for different line voltages of the AC power sources.

To overcome the shortcomings, the present invention provides a universal input switching power supply to mitigate or obviate the aforementioned problems.

SUMMARY OF THE INVENTION

An objective of the present invention is to provide a universal input switching power supply automatically having a parallel and serial type DC to DC converter changes a physical circuit thereof for different AC power source to increase the whole transforming efficiency.

The universal input switching power supply has the rectifier, a signal detecting unit detecting a voltage of an external AC power and outputting a detecting signal, a PFC circuit converts a first DC power from the rectifier to a second DC power with different voltage according to the detecting signal; and a parallel and serial type DC to DC converter converting the second DC power with different voltage to a constant voltage of the third DC power. The parallel and serial type DC to DC converter has a transformer having a primary and secondary coils and physically changes a turn ratio of the primary and secondary coils of a transformer thereof according to a voltage ratio of the second DC power and the third DC power. Accordingly, the universal input switching power supply has good transforming efficiency at different AC power source conditions.

Other objectives, advantages and novel features of the invention will become more apparent from the following detailed description when taken in conjunction with the accompanying drawings.

BRIEF DESCRIPTION OF THE DRAWINGS

FIG. 4A is a detailed circuit diagram of a partial circuit of the universal input switching power supply of FIG. 3A for a high line voltage of AC power;

FIG. 4B is a detailed circuit diagram of the partial circuit of the universal input switching power supply of FIG. 3A for a low line voltage of AC power;

DETAILED DESCRIPTION OF THE INVENTION

Figure 1:
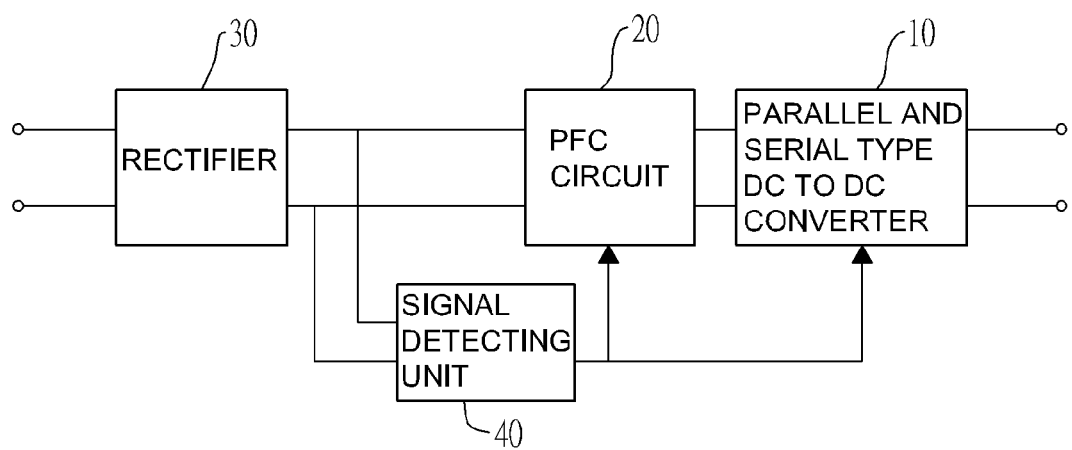
FIG. 1 is a block diagram of a universal input switching power supply in accordance with the present invention.
Figure 2:
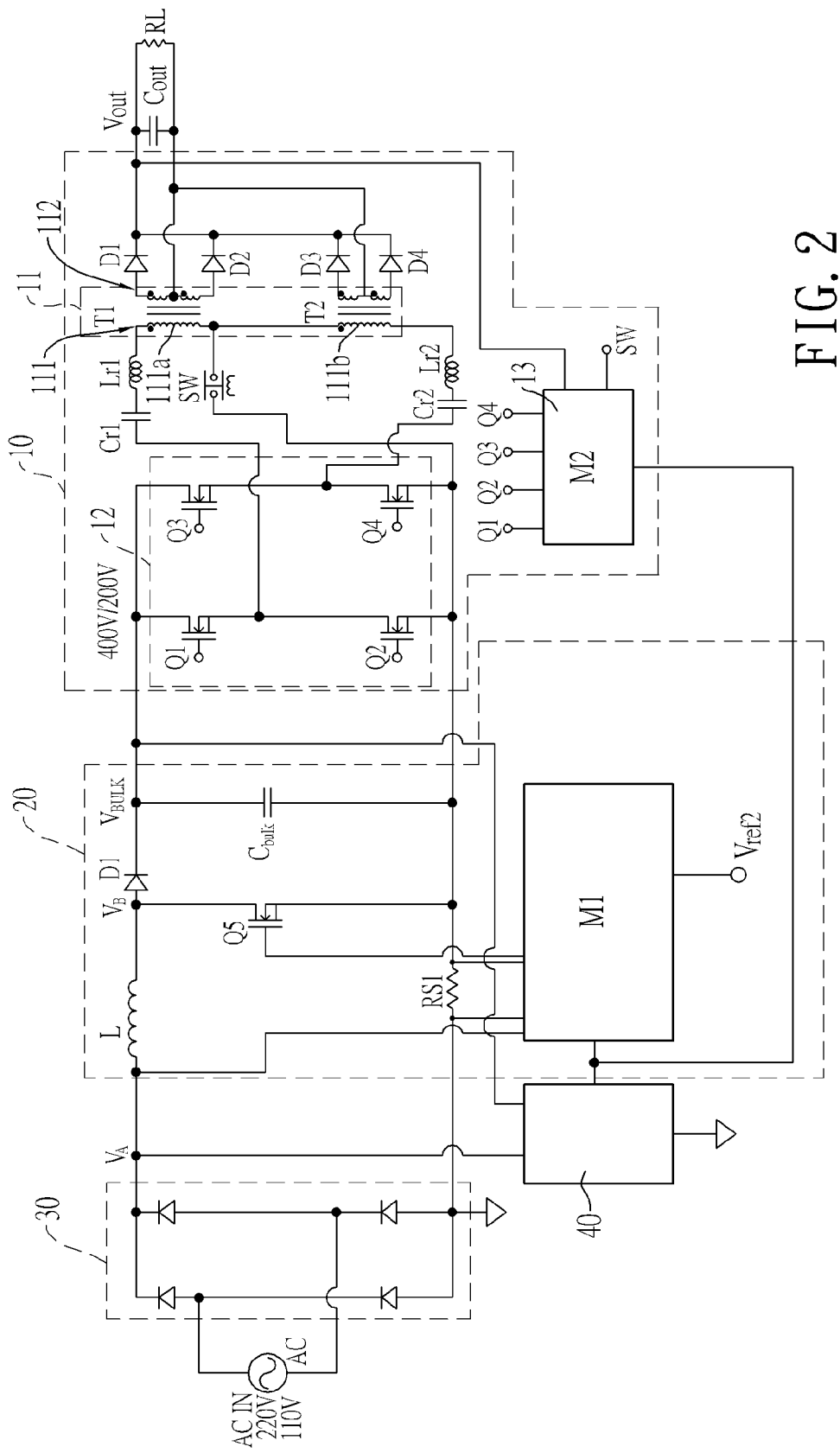
FIG. 2 is a detailed circuit diagram of a first embodiment of the partial circuit of the universal input switching power supply of FIG. 1.

With reference to FIGS. 1 and 2, a universal input switching power supply has a rectifier (30), a signal detecting unit (40), a power factor connection circuit (hereinafter PFC circuit) (20) and a parallel and serial type DC to DC converter (10).

Multiple inputs of the rectifier (30) are coupled to an external AC power (AC IN) and converts the external AC power (AC IN) to a first DC power ($V_A$). The first DC power ($V_A$) is output to the outputs of the rectifier (30).

The signal detecting unit (40) is connected to the output of the rectifier (30) to detect a status of the first DC power ($V_A$) and output a detecting signal including voltage status, current status . . . etc. statuses.

The PFC circuit (20) has inputs and outputs. The inputs of the PFC circuit (20) are connected to the outputs of the rectifier (30) and the signal detecting unit (40) to obtain the first DC power ($V_A$) and receive the detecting signal. The PFC circuit (20) converts the first DC power ($V_A$) to a second DC power ($V_{BULK}$) with different voltage according to the detecting signal including a voltage of the present AC power. In the first embodiment, the PFC circuit (30) is a boost converter.

The parallel and serial type DC to DC converter (10) has input terminals and output terminals. The input terminals thereof are connected to the outputs of the PFC circuit (10) and the signal detecting units (40) to obtain the second DC power ($V_{BULK}$) and receives the detecting signal. The parallel and serial type DC to DC converter (10) converts the second DC power ($V_{BULK}$) to a third DC power ($V_{out}$). That is, the parallel and serial type DC to DC converter (10) physically changes turn ratio of a primary and secondary coils (111, 112) of a transformer (11) thereof according to a voltage ratio of the second DC power ($V_{BULK}$) and the third DC power ($V_{out}$). The turn ratio is in direct ratio to the voltage ratio.

Figure 3A:
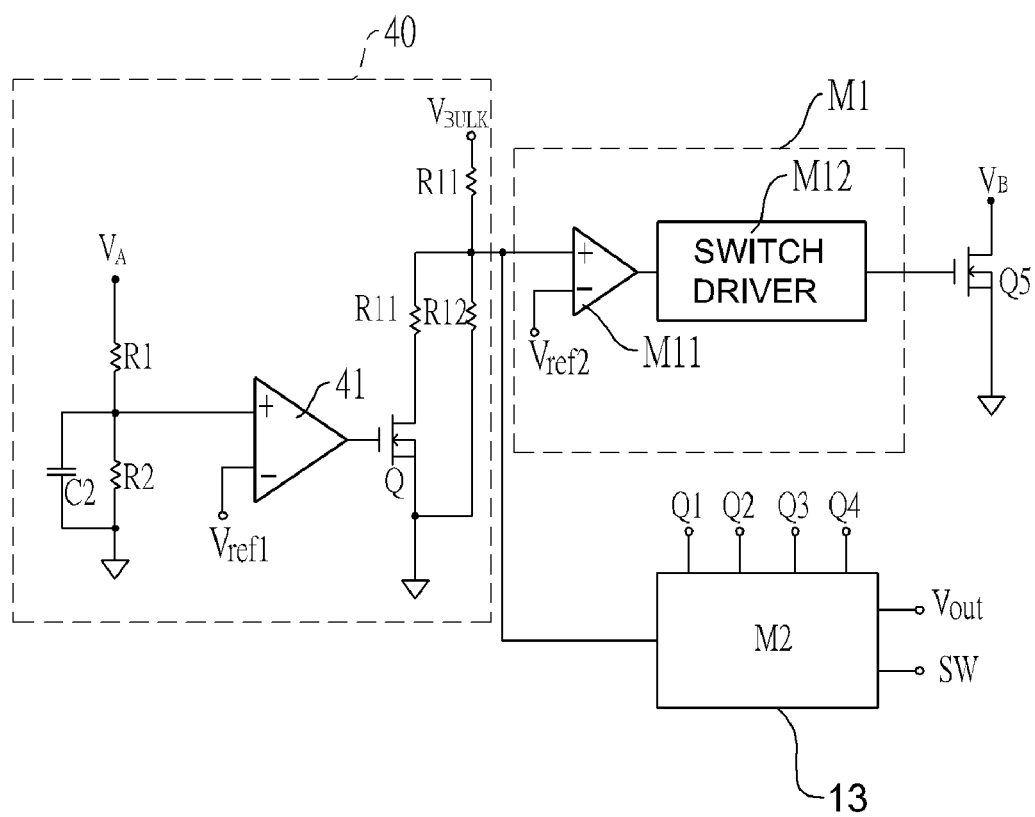
FIG. 3A is a detailed circuit diagram of a signal detecting unit, a PFC controller and a PWM controller of the first embodiment of an universal input switching power supply.

With further reference to FIG. 3A, a detailed circuit diagram of the signal detecting unit (40) is shown and the signal detecting unit (40) has a low pass filter (C2, R1, R2), a comparator (41), an electronic switch (Q) and a voltage divider (R11, R12).

The low pass filter (C2, R1, R2) is connected to the output ($V_A$) of the rectifier (30). An output voltage of the low pass filter (C2, R1, R2) is changed according to the voltage of the first DC power ($V_A$).

The comparator (41) has two inputs (+, −) and an output. One (+) of the two inputs is connected to the low pass filter (C2, R1, R2) and the other input (−) is connected to a first referenced voltage ($V_{ref1}$). The comparator (41) compares the output voltage of the low pass filter (C2, R1, R2) and the first referenced voltage ($V_{ref1}$) to output a DC signal with a continuous high and low potentials.

The electronic switch (Q) has a controlling terminal connected to the output of the comparator (41).

The voltage divider (R11, R12) is connected to the second DC power from the PFC circuit (20). The voltage divider (R11, R12) has a first and second resistors (R11, R12) connected together in serial. A serial connecting node of the first and second resistors (R11, R12) of the voltage divider is connected to the electronic switch (Q) through a serial resistor (R13). One of the inputs of the PFC circuit (20) is connected to the serial connecting node of the voltage divider (R11, R12).

Further, the boost converter for the PFC converter (20) of the first embodiment has an inductor (L1), a storage capacitor ($C_{bulk}$), a power switch (Q5) and a PFC controller (M1).

One end of the inductor (L1) is connected to one of the outputs of the rectifier (20). The storage capacitor ($C_{bulk}$) is connected to the other end of the inductor (L1) and the ground. The power switch (Q5) is connected between a connecting node of the inductor (L1) and the storage capacitor ($C_{bulk}$), and the ground. The power switch (Q5) has a controlling terminal. The PFC controller (M1) is connected to the controlling terminal of the power switch (Q5) and the signal detecting unit (11), and outputs a first PWM signal to the controlling terminal of the power switch (Q5). The power switch (Q5) turns on or off according to the first PWM signal. The PFC controller (M1) has an error amplifier (M11), a second referenced voltage ($V_{ref2}$) and a driver (M12). The error amplifier (M11) has two input terminals (+, −). One (−) of the two input terminals is connected to the second referenced voltage ($V_{ref2}$) and the other (+) is connected to the serial connecting node of the voltage divider (R11, R12) of the signal detecting unit (40). The output terminal of the error amplifier (M11) is connected to the driver (M12) and the switch driver (M12) is connected to the controlling terminal of the power switch (Q5).

When the inputs of the rectifier (30) are coupled to a 220V AC power, the comparator (41) of the signal detecting unit (40) outputs high potential signal to the electronic switch (Q) by comparing the output voltage of the low pass filter (C2, R1, R2) and the first referenced voltage ($V_{ref1}$). And then the electronic switch (Q) turns on. At the time, the serial resistor (R13) is connected to the second resistor (R12) of the voltage divider of the voltage detector in parallel. Therefore, a voltage of the input terminal (+) of the error amplifier (M11) is decreased. The error amplifier (M11) outputs a low potential signal to the switch driver (M12). The switch driver (M12) modulates the pulse widths of the PWM signal to boost the voltage ($V_{BULK}$) of the storage capacitor ($C_{bulk}$) to 400V second DC power source ($V_{C1}$). On the contrary, when the inputs of the rectifier (30) is coupled to an 110V AC power source, the comparator (41) of the voltage detector (40) outputs low potential signal to the electronic switch (Q) and then the electronic switch (Q) turns off. At the time, the serial resistor (R13) is not connected to the second resistor (R12) of the signal detecting unit (40) in parallel. Therefore, the voltage of the input terminal (+) of the error amplifier (M11) is increased. The error amplifier (M11) outputs a high potential signal to the switch driver (M12). The switch driver (M12) modulates the pulse widths of the PWM signal to boost the voltage ($V_{BULK}$) of the storage capacitor ($C_{bulk}$) to 200V second DC power source ($V_{C1}$). Therefore, the PFC circuit (20) outputs different voltage of the second DC power to the parallel and serial type DC to DC converter (10) according to different external AC power.

With reference to FIG. 2, the parallel and serial type DC to DC converter (10) of the first embodiment of the present invention has the transformer (11), a full bridge switching unit (12), a switch (SW), a PWM controller (13).

The transformer (11) is a central-tapped transformer having a central-tapped primary coil (111) and a secondary coil (112). The central-trapped primary (111) has a first winding (111a), a second winding (111b) and a central terminal (not numbered). The secondary coil (112) outputs the third DC power (Vout) through a rectifying and filtering circuit (D1 to D4, $C_{out}$).

The full bridge switching unit (12) is connected to the second DC power ($V_{BULK}$) of the PFC circuit (20) and has a first switching set (not numbered) and a second switching set (not numbered) connected to the first switching set in parallel. Each of the first and second switching sets has an upper switch (Q1, Q3) and a lower switch (Q2, Q4) connected to the upper switch (Q1, Q3) in serial. Two serial connecting nodes of the first and second switching sets are respectively connected to two ends of the primary coil (111). Each of the upper and lower switches (Q1 to Q4) may be MOSFET or IGBT etc. In the first embodiment, the MOSFET is used and a controlling terminal thereof is a gate terminal.

The switch (SW) is connected between the central terminal of the first coil (111) and the ground of the second DC power ($V_{BULK}$). The switch (SW) may be a rely.

Figure 3B:
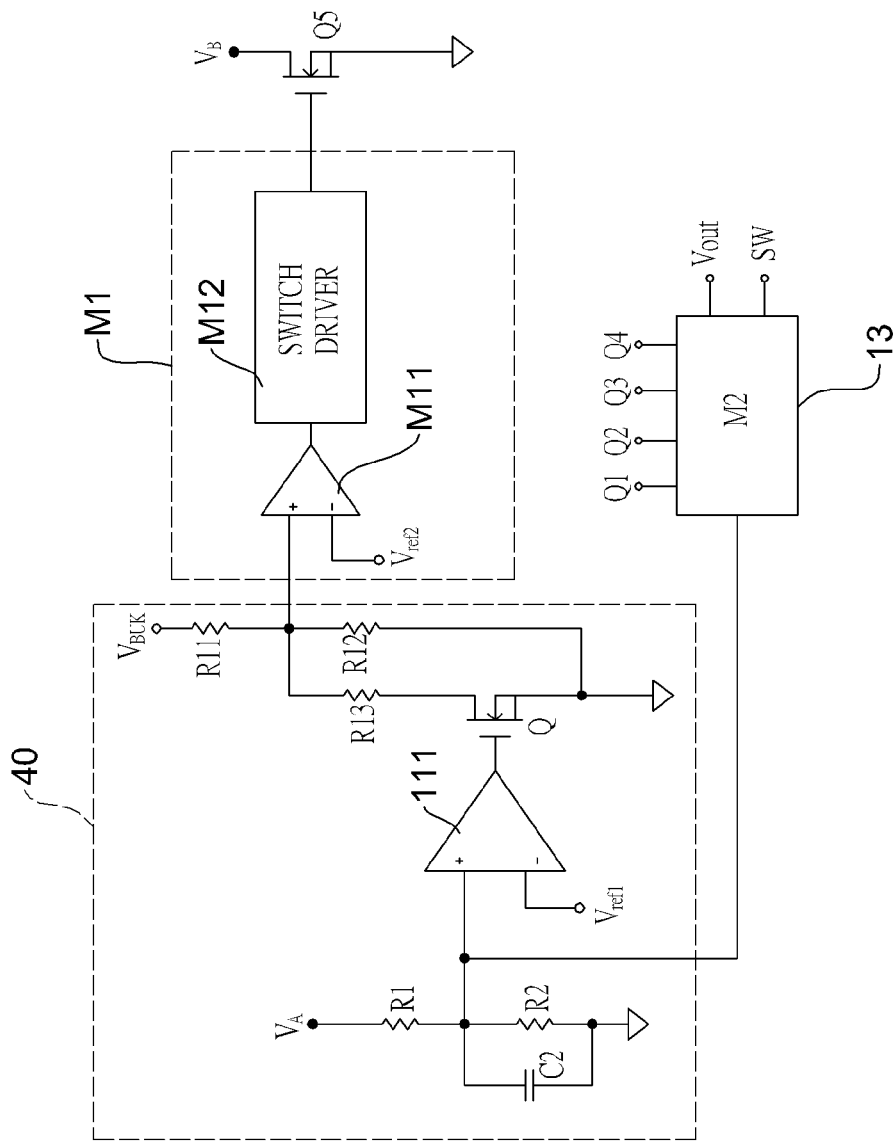
FIG. 3B is another detailed circuit diagram of the signal detecting unit, the PFC controller and the PWM controller of the first embodiment of an universal input switching power supply.

The PWM controller (13) is connected to the signal detecting unit (40) and the controlling terminals of the upper and lower switches (Q1 to Q4) of the first and second switching sets. With reference to FIG. 3A, the PWM controller (13) is connected to the serial connecting node of the voltage divider (R11, R12) of the signal detecting unit (40). In addition, the PWM controller (13) is also connected to the low pass filter (C2, R1, R2) of the signal detecting unit (40) as shown in FIG. 3B. After the PWM controller (13) receives the detecting signal from the detecting signal unit (40), the PWM controller (13) executes an adjusting turn ratio procedure. That is, when the PWM controller (13) determines that the low line voltage of the present AC power is coupled to the power supply, the PWM controller (13) drive the full bridge switching unit (12) to change the turn ratio of the transformer (111). Since the turn ratio is in direct ratio to the voltage ratio, the third DC power ($V_{out}$) output from the parallel and serial type DC to DC converter (10) has a constant voltage no matter the power supply coupled to the high or low line voltage of the AC power.

With reference to FIG. 4A, since the PFC circuit (20) is a boost converter, the PFC circuit (20) outputs the second DC power ($V_{BULK}$) with a first high voltage when the power supply is coupled to the high line voltage of the AC power. For example, when the power supply is coupled to 220 AVC of the AC power, the PFC circuit (20) outputs 400 DCV of the second DC power ($V_{BULK}$). Therefore, the PWM controller (13) has to make the first and second windings (111a, 111b) being serially connected so the transformer (11) has a maximum of the turn ratio (Na:Nb). In this condition, the PWM controller (13) turns the upper switch (Q3) of the second switching set off, turns the lower switch (Q4) of the second switching set on, and outputs a first PWM signal (PWM1) with 50% duty cycle to the upper switch (Q1) of the first switching set, and a second PWM signal (PWM2) with 50% duty cycle to the lower switch (Q2) of the first and second switching set. The second PWM signal is an inverted PWM signal of the first PWM signal, so the upper switch (Q1) of the first switching set and the lower switch (Q2) of the second switching set are driven to turn on alternatively. At the time, the PWM controller (13) also drives the switch (SW) to turn off. Since the first and second windings (111a, 111b) of the primary coil (111) are respectively further connected to the inductors ($L_{r1}$, $L_{r2}$,) and the capacitor ($C_{r1}$, $C_{r2}$) in serial, the resonant tank is established when the upper switch (Q1) or the lower switch (Q2) is turned on.

The first and second windings (111a, 111b) of the primary coil (111) are respectively further connected to the inductors ($L_{r1}$, $L_{r2}$,) and the capacitor ($C_{r1}$, $C_{r2}$) in serial, another resonant tank is established when the lower switches (Q2, Q4) are turned on.

With reference to FIG. 4B, when the power supply is coupled to 110 AVC of the AC power, the PFC circuit (20) outputs 200 DCV of the second DC power. Therefore, the PWM controller (13) has to make the first and second windings (111a, 111b) being parallelly connected so the transformer (11) has a half of the turns of the primary coil (11). Therefore, the turn ratio of the transformer (11) is Na/2:Nb to match with the voltage ratio. In this condition, the PWM controller (13) outputs the first PWM signal (PWM1) with 50% duty cycle to the upper switches (Q1, Q3) of the first and second switching sets, and the second PWM signal (PWM2) with 50% duty cycle to the lower switches (Q2, Q4) of the first and second switching set. The second PWM signal is an inverted PWM signal of the first PWM signal, so the upper switches (Q1, Q3) of the first and second switching sets and the lower switches (Q2, Q4) of the first and second switching sets are driven to turn on alternatively. That is, the upper switches (Q1, Q3) are turned on and off synchronously and the lower switches (Q2, Q4) are turned on and off synchronously. At the time, the PWM controller (13) also drives the switch (SW) to turn on. Since the first and second windings (111a, 111b) of the primary coil (11) are respectively further connected to the inductors ($L_{r1}$, $L_{r2}$,) and the capacitor ($C_{r1}$, $C_{r2}$) in serial, the resonant tank is established when the upper switches (Q1, Q3) are turned on. The first and second windings (111a, 111b) of the primary coil (11) are respectively further connected to the inductors ($L_{r1}$, $L_{r2}$,) and the capacitor ($C_{r1}$, $C_{r2}$) in serial, another resonant tank is established when the lower switches (Q2, Q4) are turned on.

Based on the foregoing description, the PWM controller (13) executed the adjusting turn ratio procedure according to a logic list as following:

| AC power | $V_{BULK}$ | Q1 | Q2 | Q3 | Q4 | SW |
|---|---|---|---|---|---|---|
| High line Voltage range (220 V) | 400DCV | 50% DUTY (PWM1) | 50% DUTY (PWM2) | OFF | ON | OFF |
| Low line Voltage range (110 V) | 200DCV | 50% DUTY (PWM1) | OFF | 50% DUTY (PWM1) | OFF | ON |
|  |  | OFF | 50% DUTY (PWM2) | OFF | 50% DUTY (PWM2) | ON |

Figure 5:
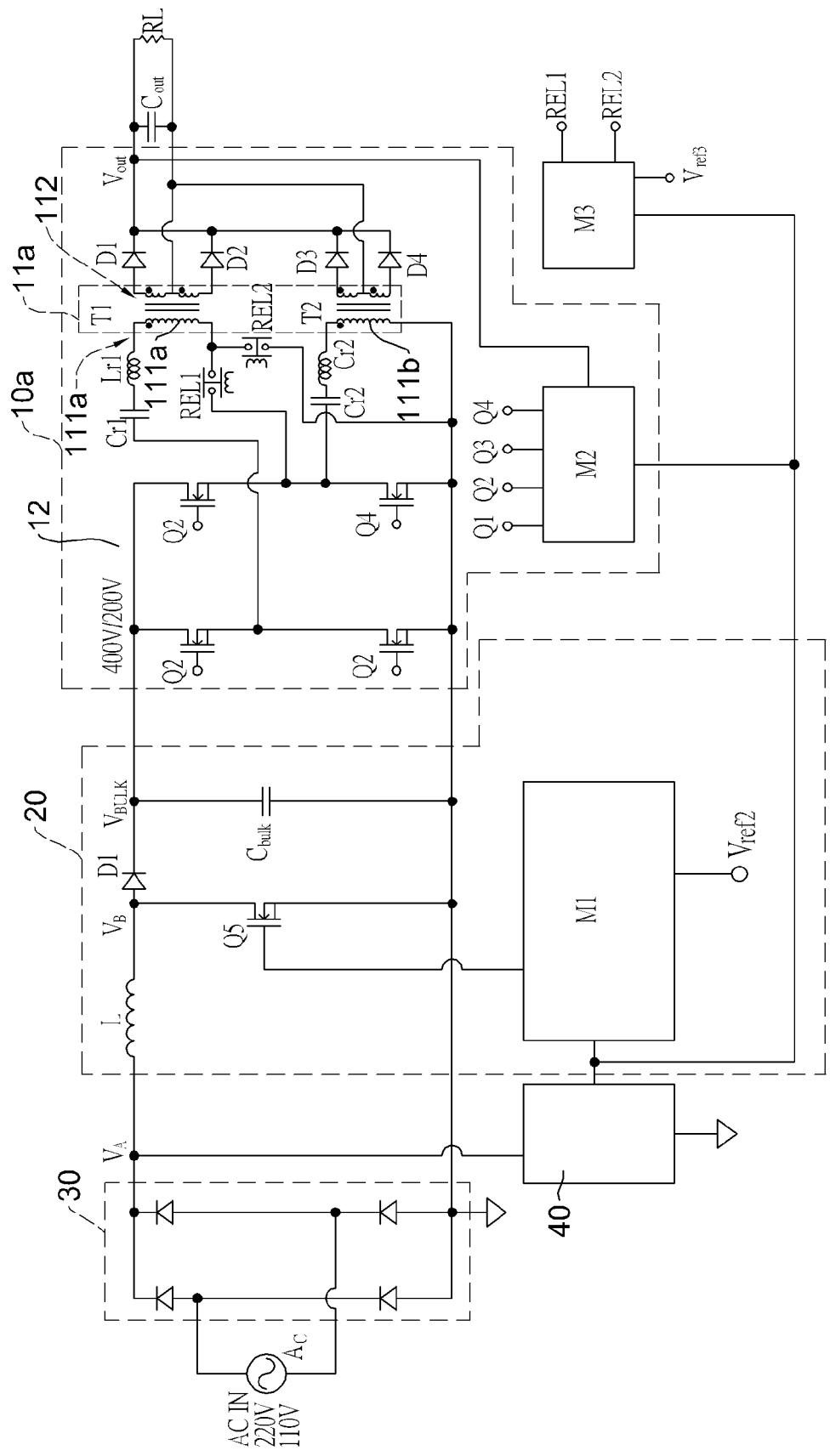
FIG. 5 is a detailed circuit diagram of a second embodiment of the partial circuit of the universal input switching power supply of FIG. 1.

With reference to FIG. 5, a second embodiment of a power supply in accordance with the present invention is similar to the first embodiment but a parallel and serial type DC to DC converter (10a) of the second embodiment differs from that of the first embodiment. The parallel and serial type DC to DC converter (10a) has the transformer (11), a full bridge switching unit (12), a PWM controller (M2), a first and second electronic switches (REL1, REL2) and a switch driver (M3).

The transformer (11) has a primary coil (111) and a secondary coil (112). The primary coil (111) has a first winding (111a) and a second winding (111b). The secondary coil (112) outputs the third DC power through a rectifying and filtering circuit (D1 to D4, $C_{out}$). Each of the first and second windings (111a, 111b) is connected to an inductor ($L_{r1}$, $L_{r2}$,) and a capacitor ($C_{r1}$, $C_{r2}$) in serial.

The full bridge switching unit (12) is connected to the second DC power of the PFC circuit (20) and has a first switching set and a second switching set connected to the first switching set in parallel. Each of the first and second switching sets has an upper switch (Q1, Q3) and a lower switch (Q2, Q4) connected to the upper switch (Q1, Q3) in serial. Each of the upper and lower switches (Q1 to Q4) may be MOSFET or IGBT etc. In the first embodiment, the MOSFET is used and a controlling terminal thereof is a gate terminal.

One end of the first winding (111a) is connected to a serial connecting node of the first switching set through the inductor ($L_{r1}$) and a capacitor ($C_{r1}$), and the other end thereof is connected to a serial connecting node of the second switching set through the first electronic switch (REL1). One end of the second winding (111b) is connected to the serial connecting node of the second switching set through the inductor ($L_{r1}$) and a capacitor ($C_{r1}$), and the other end thereof is connected to the ground. The second electronic switch (REL2) is connected between a connected node of the first winding (111a) and the first electronic switch (REL1) and the ground. Each of the first and second electronic switches (REL1, REL2) may be a rely.

The PWM controller (M2) is connected to the signal detecting unit (40) and the controlling terminals of the upper and lower switches (Q1 to Q4) of the first and second switching sets. The PWM controller (M2) drives the upper and lower switches (Q1 to Q4) to turn on and off according to the detecting signal from the signal detecting unit (40).

Figure 6:
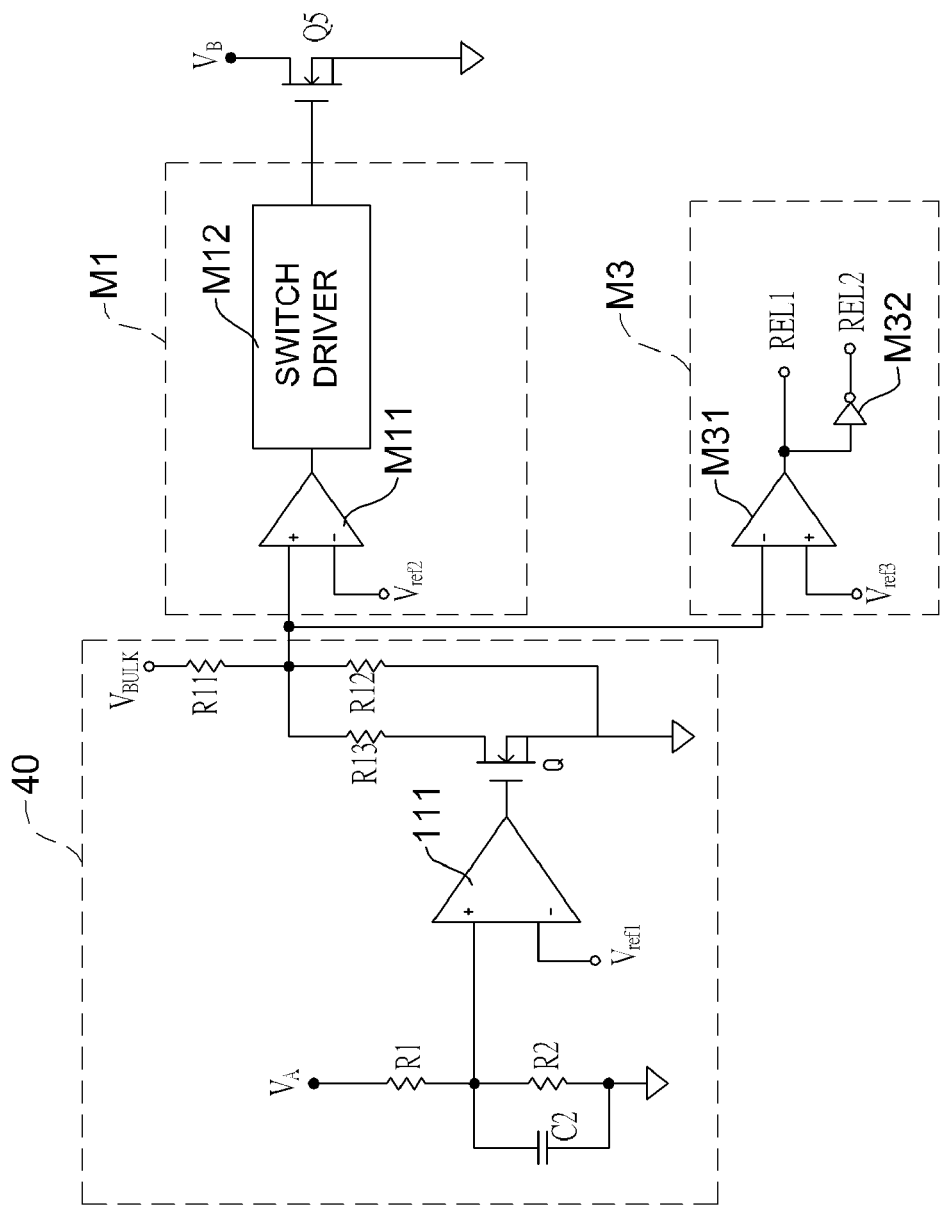
FIG. 6 is a detailed circuit diagram of the signal detecting unit, a PFC controller and a PWM controller of FIG. 5.

The processor (M3) is connected to the signal detecting unit (40), the controlling terminals of the first and second electronic switches (REL1, REL2) and a third referenced voltage ($V_{ref3}$), and has an adjusting turn ratio procedure. With further reference to FIG. 6, the processor (M3) has a comparator (M31) and an inverter (M32). Two inputs of the comparator (M31) are respectively connected to the output terminal of the signal detecting unit (40) and the third referenced voltage ($V_{ref3}$). An output of the comparator (M31) is directly connected to the controlling terminal of the first electronic switch (REL1) and connected to the controlling terminal of the second electronic switch (REL2) through the inverter (M32). In addition, one of the two input of the comparator (M31) is also connected to the low power filter (C2, R1, R2) of the signal detecting unit (40). The processor (M3) drives the first and second electronic switches (REL1, REL2) to turn on and off according to the detecting signal from the signal detecting unit (40).

Figure 7A:
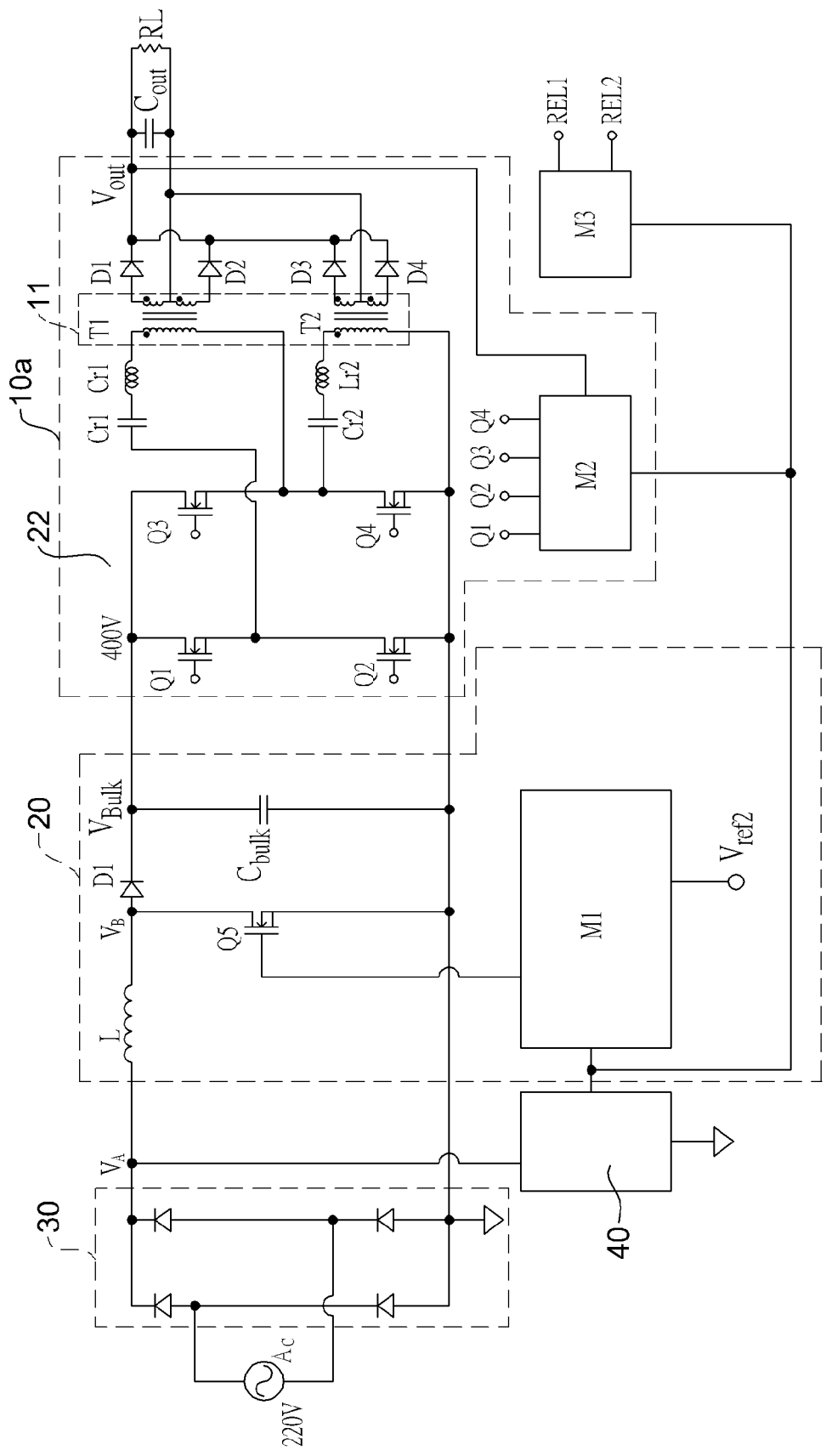
FIG. 7A is a detailed circuit diagram of a partial circuit of the universal input switching power supply of FIG. 3 for a high line voltage of AC power.

With further reference to FIG. 7A, when the inputs of the rectifier (30) are coupled to a 220V AC power, the signal detecting unit (40) outputs high potential detecting signal to the input of the comparator (M31) of the processor (M3). The comparator (M31) compares that the detecting signal and the third referenced voltage ($V_{ref3}$) and drive the first electronic switch (REL1) to turn on and to turn the second electronic switch (REL2) off. Therefore the first and second winding (111a, 111b) of the primary coil (111) are connected in serial. At the time, the PWM controller (M2) turns the upper switch (Q3) of the second switching set off, turns the lower switch (Q4) of the second switching set of, and outputs a first PWM signal (PWM1) with 50% duty cycle to the upper switch (Q1) of the first switching set, and a second PWM signal (PWM2) with 50% duty cycle to the lower switch (Q2) of the first and second switching set. The second PWM signal is an inverted PWM signal of the first PWM signal, so the upper switch (Q1) of the first switching set and the lower switch (Q2) of the second switching set are driven to turn on alternatively.

Figure 7B:
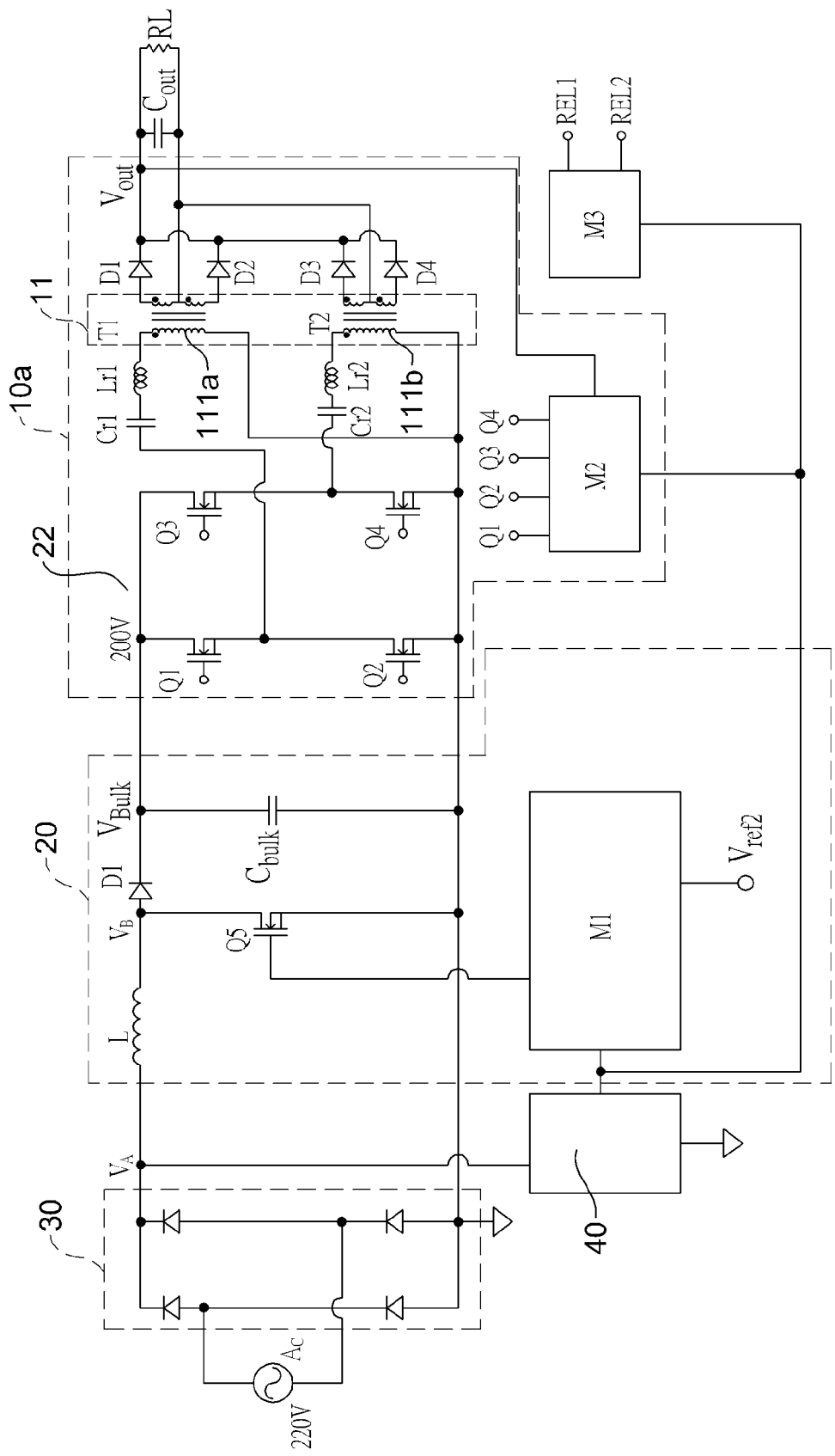
FIG. 7B is a detailed circuit diagram of the partial circuit of the universal input switching power supply of FIG. 3 for a low line voltage of AC power.

On the contrary, with further reference to FIG. 7B, when the inputs of the rectifier (30) is coupled to an 110V AC power source, the signal detecting unit (40) outputs low potential detecting signal to the input of the comparator (M31) of the processor (M3). The comparator (M31) compares that the detecting signal and the third referenced voltage ($V_{ref3}$) and drive the first electronic switch (REL1) to turn off and to turn the second electronic switch (REL2) on. Therefore the first and second windings (111a, 111b) of the primary coil are connected in parallel. At the time, the PWM controller (M2) outputs the first PWM signal (PWM1) with 50% duty cycle to the upper switches (Q1, Q3) of the first and second switching sets, and the second PWM signal (PWM2) with 50% duty cycle to the lower switches (Q2, Q4) of the first and second switching set. The second PWM signal is an inverted PWM signal of the first PWM signal, so the upper switches (Q1, Q3) of the first and second switching sets and the lower switches (Q2, Q4) of the first and second switching sets are driven to turn on alternatively. That is, the upper switches (Q1, Q3) are turned on and off synchronously and the lower switches (Q2, Q4) are turned on and off synchronously.

Based on the foregoing description, the processor (M3) executed the adjusting turn ratio procedure according to a logic list as following:

| AC power | $V_{BULK}$ | Q1 | Q2 | Q3 | Q4 | REL1 | REL2 |
|---|---|---|---|---|---|---|---|
| High line Voltage range (220 V) | 400DCV | 50% DUTY (PWM1) | 50% DUTY (PWM1) | OFF | OFF | ON | OFF |
| Low line Voltage range (110 V) | 200DCV | 50% DUTY (PWM1) | OFF | 50% DUTY (PWM1) | OFF | OFF | ON |
|  |  | OFF | 50% DUTY (PWM2) | OFF | 50% DUTY (PWM2) | OFF | ON |

Figure 8:
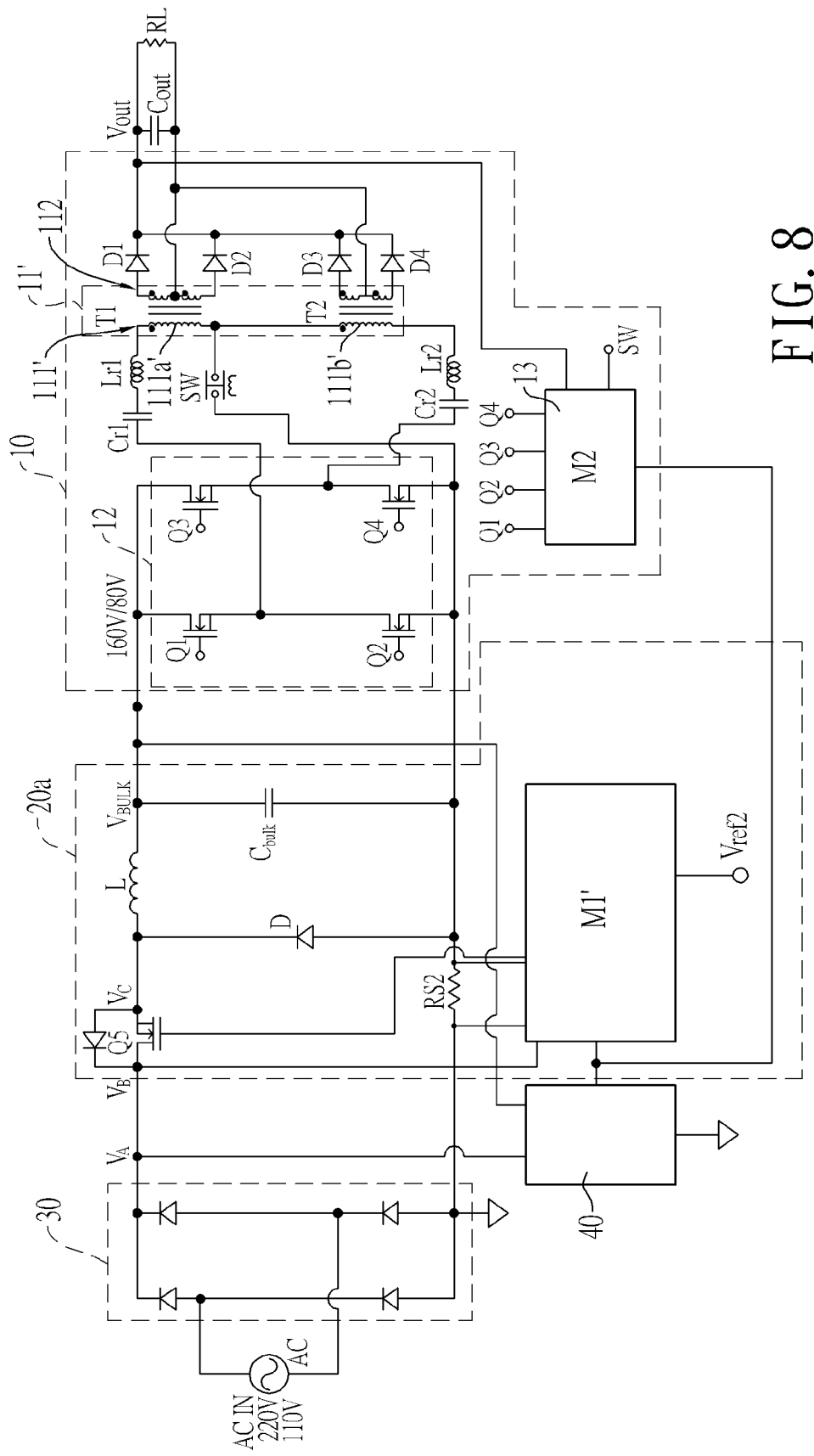
FIG. 8 is a detailed circuit diagram of a third embodiment of the partial circuit of the universal input switching power supply of FIG. 1.
Figure 9:
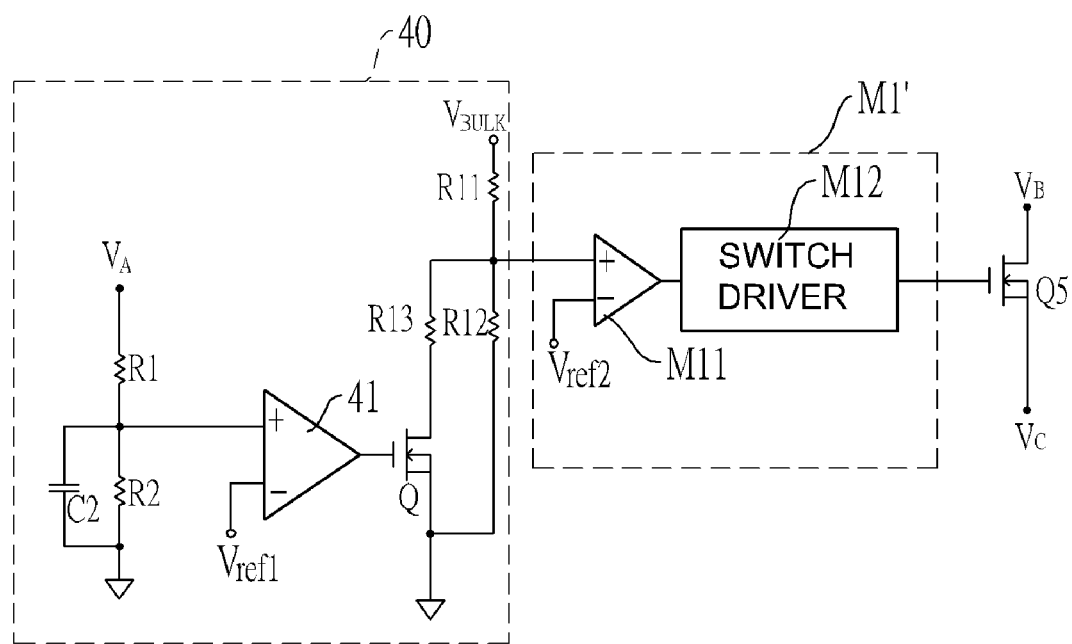
FIG. 9 is a detailed circuit diagram of a partial circuit of the second embodiment of the universal input switching power supply of FIG. 8.

With reference to FIGS. 8 and 9, a third embodiment of a power supply in accordance with the present invention is similar to the first embodiment but a PFC circuit (20a) of the third embodiment is a buck converter. The buck converter has a power switch (Q5), an inductor (L), a diode (D), a storage capacitor ($C_{bulk}$) and a PFC controller (M1'). A first terminal of the electronic switch (Q5) is connected to the output of the rectifier (30) to obtain the first DC power ($V_A$). One end of the inductor (L) is connected to a second terminal of the power switch (Q5) and the other end thereof is connected to one end of the storage capacitor ($C_{bulk}$). The cathode of the diode (D) is connected between the second terminal of the power switch (Q5) and inductor (L) and the anode thereof is connected to the ground. The other end of the capacitor ($C_{bulk}$) is connected to the ground. The storage capacitor ($C_{bulk}$) is supplied the second DC power ($V_{bulk}$) to the parallel and serial type DC to DC converter (10b). The PFC controller (M1') is connected to a controlling terminal of the power switch (Q5) and the output terminal of the signal detecting unit (40). The PFC controller (M1') drives the power switch (Q5) to turn on and off according to the detecting signal from the signal detecting unit (40). The PFC controller (M1') has an error amplifier (M11), a second referenced voltage ($V_{ref2}$) and a switch driver (M12). Two inputs of the error amplifier (M11) are respectively connected to the second referenced voltage ($V_{ref2}$) and the serial connecting node of the voltage divider (R11, R12) of the signal detecting unit (40).

When the inputs of the rectifier (30) are coupled to a 220V AC power, the comparator (41) of the signal detecting unit (40) outputs high potential signal to the electronic switch (Q) by comparing the output voltage of the low pass filter (C2, R1, R2) and the first referenced voltage ($V_{ref1}$). And then the electronic switch (Q) turns on. At the time, the serial resistor (R13) is connected to the second resistor (R12) of the voltage divider of the voltage detector in parallel. Therefore, a voltage of the input terminal (+) of the error amplifier (M11) is decreased. The error amplifier (M11) outputs a low potential signal to the driver (M12). The driver (M12) modulates the pulse widths of the PWM signal to boost the voltage of the storage capacitor ($C_{bulk}$) to 160V second DC power source ($V_{BULK}$). On the contrary, when the inputs of the rectifier (30) is coupled to an 110V AC power source, the comparator (41) of the voltage detector (40) outputs low potential signal to the electronic switch (Q) and then the electronic switch (Q) turns off. At the time, the serial resistor (R13) is not connected to the second resistor (R12) of the signal detecting unit (40) in parallel. Therefore, the voltage of the input terminal (+) of the error amplifier (M11) is increased. The error amplifier (M11) outputs a high potential signal to the driver (M12). The driver (M12) modulates the pulse widths of the PWM signal to boost the voltage of the storage capacitor (C1) to 80V second DC power source ($V_{BULK}$). Therefore, the PFC circuit (20a) outputs different voltage of the second DC power ($V_{BULK}$) to the parallel and serial type DC to DC converter (10) according to different external AC power.

Figure 10A:
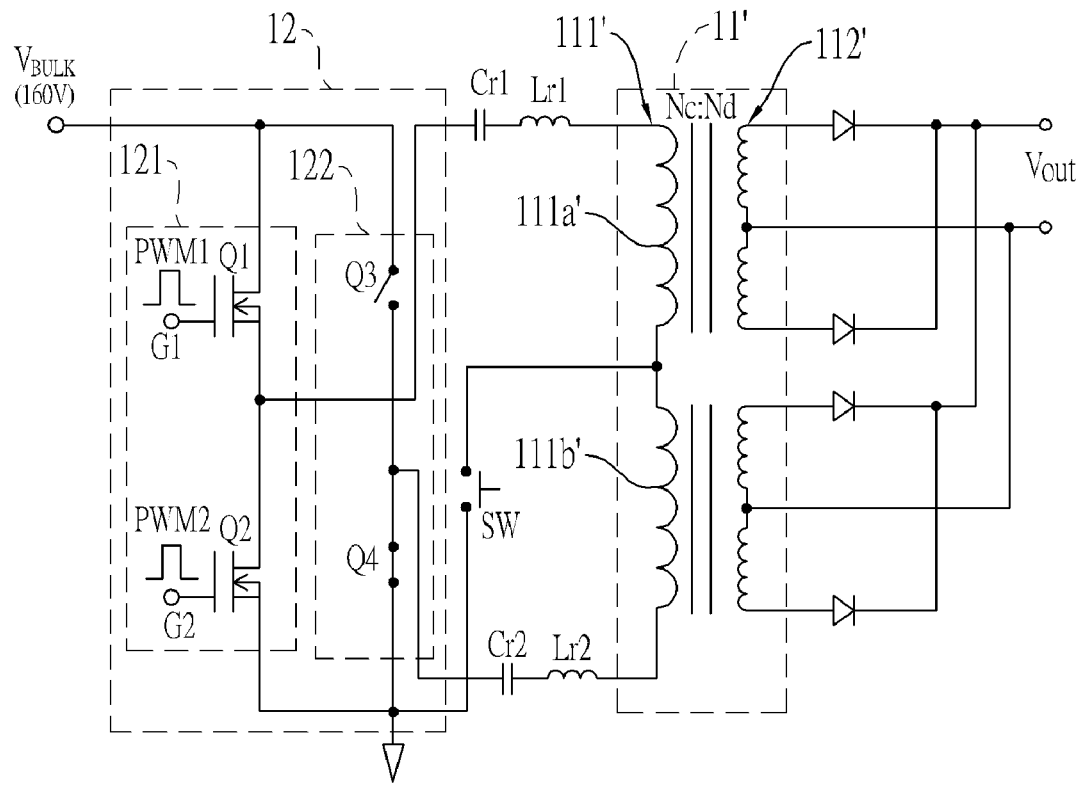
FIG. 10A is a detailed circuit diagram of a partial circuit of the universal input switching power supply of FIG. 5 for a high line voltage of AC power.
Figure 10A:
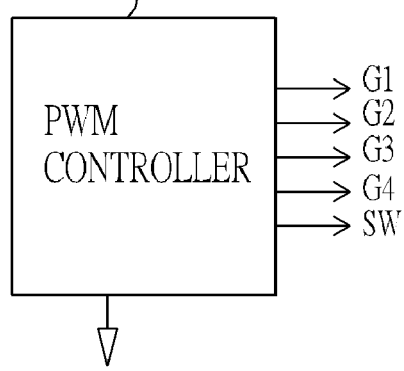

With further reference to FIG. 10A, since the PFC circuit (20a) is a buck converter, the PFC circuit (20a) outputs the second DC power ($V_{BULK}$) with a first high voltage when the power supply is coupled to the high line voltage of the AC power. For example, when the power supply is coupled to 220 AVC of the AC power, the PFC circuit outputs 160 DCV of the second DC power. Therefore, the PWM controller (13) has to make the first and second windings being serially connected so the transformer (11') has a maximum of the turn ratio (Nc:Nd). In this condition, the PWM controller (13) turns the upper switch (Q3) of the second switching set off, turns the lower switch (Q4) of the second switching set on, and outputs a first PWM signal (PWM1) with 50% duty cycle to the upper switch (Q1) of the first switching set, and a second PWM signal (PWM2) with 50% duty cycle to the lower switch (Q2) of the first and second switching set. At the time, the switch (SW) is driven to turn off, so the first and second windings (111a', 111b') of the primary coil (111') are connected in serial and the primary coil (111') is connected between the two serial connecting nodes of the first and second switching sets. In this example, if the voltage of the third DC power ($V_{out}$) is 5 DCV, the turn ratio (Nc:Nd) will be 32:1 to match with the voltage ratio of the voltage of the second DC power ($V_{BULK}$) and the voltage of the third DC power ($V_{out}$). Since the first and second windings (111a', 111b') of the primary coil (11') are respectively connected to inductors ($L_{r1}$, $L_{r2}$) and the capacitor ($C_{r1}$, $C_{r2}$) in serial, a resonant tank is established when the second DC power ($V_{BULK}$) is supplied to the transformer (11'). Therefore, the parallel and serial type DC to DC converter (10) outputs the stable third DC power ($V_{out}$).

Figure 10B:
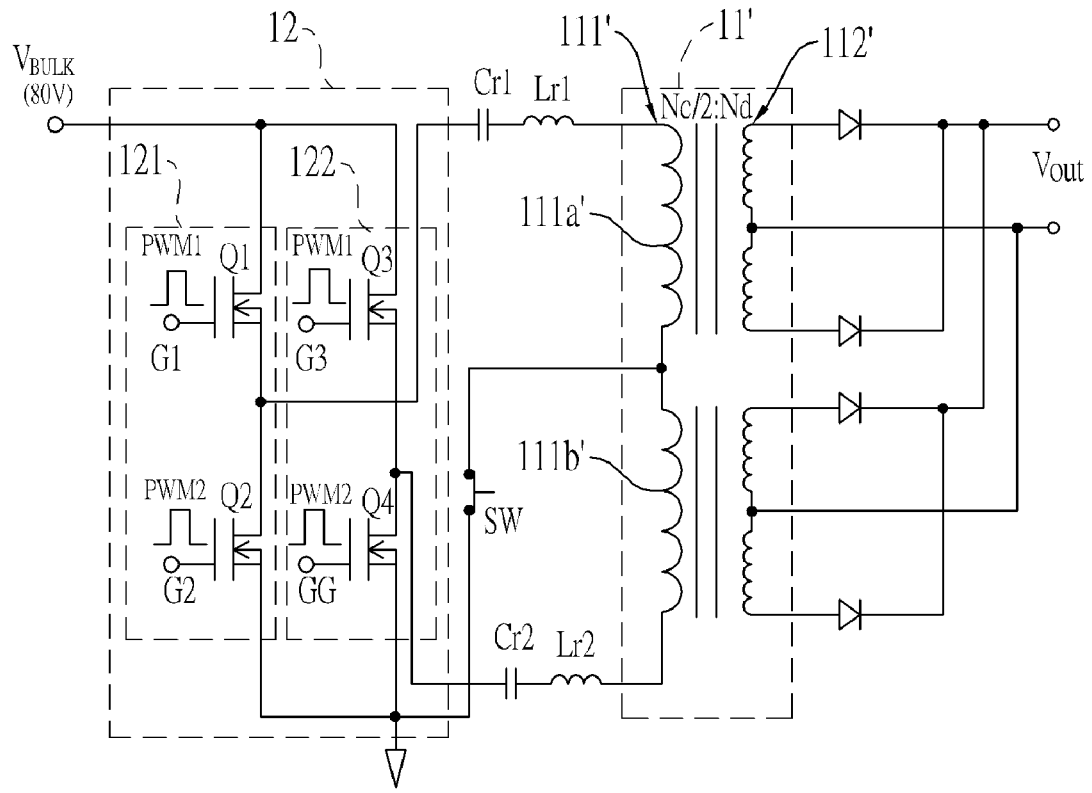
FIG. 10B is a detailed circuit diagram of the partial circuit of the universal input switching power supply of FIG. 5 for a low line voltage of AC power.
Figure 10B:
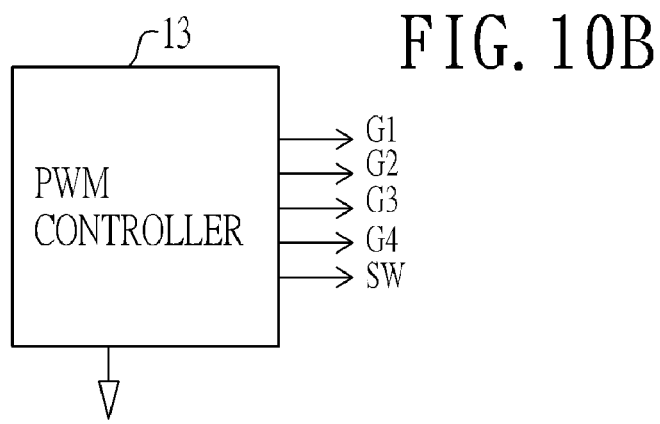
Figure 11:
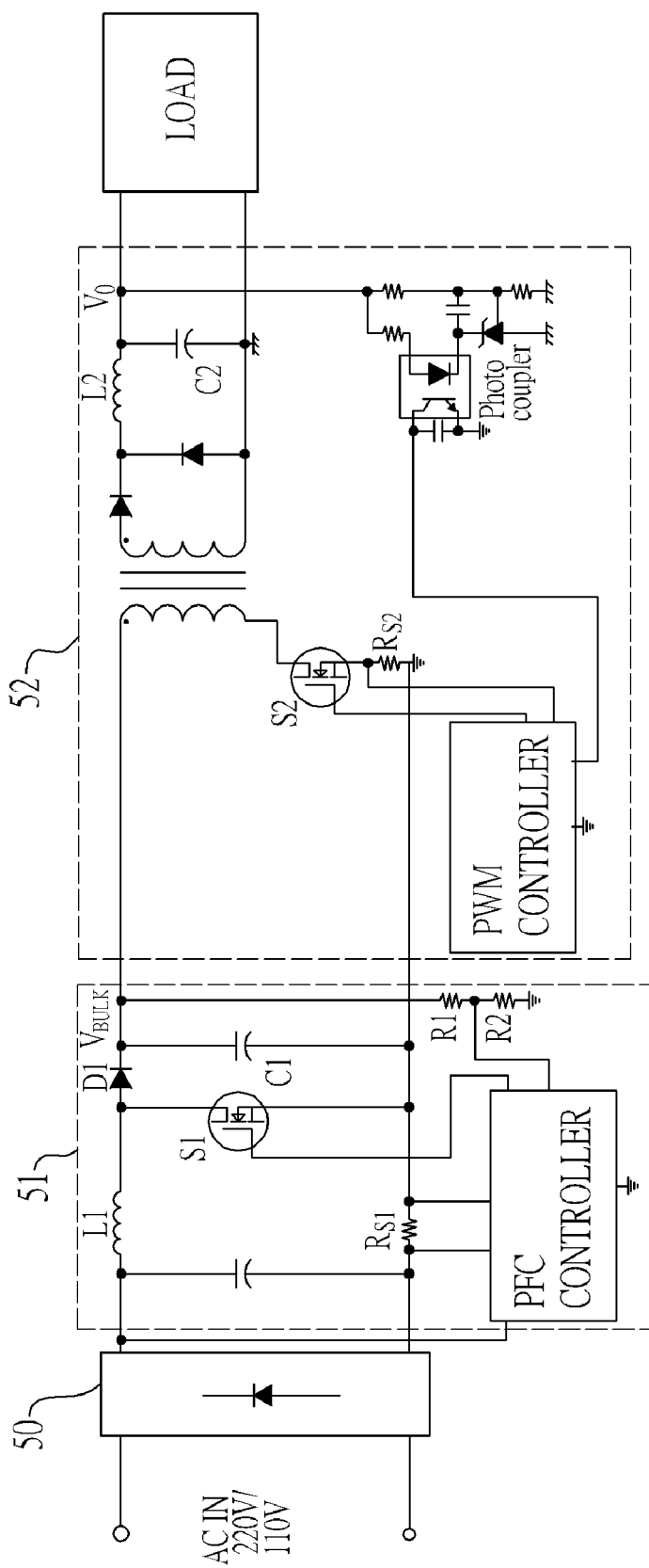
FIG. 11 is a detailed circuit diagram of a conventional universal input switching power supply in accordance with the prior art.

With further reference to FIG. 10B, when the power supply is coupled to 110 AVC of the AC power, the PFC circuit outputs 80 DCV of the second DC power. Therefore, the PWM controller (13) has to make the first and second windings (111a', 111b') being parallelly connected so the transformer (11') has a half of the turns of the primary coil (111'). Therefore, the turn ratio of the transformer is Nc/2:Nd to match with the voltage ratio. In this condition, the PWM controller (13) outputs the first PWM signal (PWM1) with 50% duty cycle to the upper switches (Q1, Q3) of the first and second switching sets, and the second PWM signal (PWM2) with 50% duty cycle to the lower switches (Q2, Q4) of the first and second switching set. The second PWM signal is an inverted PWM signal of the first PWM signal, so the upper switches (Q1, Q3) of the first and second switching sets and the lower switches (Q2, Q4) of the first and second switching sets are driven to turn on alternatively. That is, the upper switches (Q1, Q3) are turned on and off synchronously and the lower switches (Q2, Q4) are turned on and off synchronously. At the time, the PWM controller (13) also drives the switch (SW) to turn on. Since the first and second windings (111a', 111b') of the primary coil (111') are respectively further connected to the inductors ($L_{r1}$, $L_{r2}$) and capacitors ($C_{r1}$, $C_{r2}$) in serial, the resonant tank is established when the upper switches (Q1, Q3) are turned on. The first and second windings (111a', 111b') of the primary coil (111') are respectively further connected to the inductors ($L_{r1}$, $L_{r2}$) and capacitors ($C_{r1}$, $C_{r2}$) in serial, another resonant tank is established when the lower switches are turned on.

Based on the foregoing description, the PWM controller (13) executed the adjusting turn ratio procedure according to a logic list as following:

| AC power | $V_{BULK}$ | Q1 | Q2 | Q3 | Q4 | SW |
|---|---|---|---|---|---|---|
| High line Voltage range (220 V) | 160DCV | 50% DUTY (PWM1) | 50% DUTY (PWM2) | OFF | ON | OFF |
| Low line voltage range (110 V) | 80DCV | 50% DUTY (PWM1) | OFF | 50% DUTY (PWM1) | OFF | ON |
|  |  | OFF | 50% DUTY (PWM2) | OFF | 50% DUTY (PWM2) | ON |

Based on the foregoing description, the PFC circuit outputs different voltage of the second DC power according to the different voltage of the AC power. The parallel and serial type DC to DC converter automatically and physically changes coil ratio of the transformer thereof to match with the voltage ratio of voltage of the second DC power and the voltage of third DC power. Therefore, transforming efficiency of the PFC circuit is increased.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A universal input switching power supply comprising:
   the rectifier having multiple inputs adapted to couple to an external AC power and an output, wherein the rectifier converts the external AC power and output the first DC power to the output thereof;
   a signal detecting unit connected to the output of the rectifier to detect a voltage of the first DC power and output a detecting signal;
   a PFC circuit having multiple outputs and inputs connected to the output of the rectifier and the signal detecting unit to obtain the first DC power and receive the detecting signal, wherein the PFC circuit converts the first DC power to a second DC power with different voltage according to the detecting signal; and
   a parallel and serial type DC to DC converter having a transformer having a primary and secondary coils, input terminals and output terminals, wherein the input terminals thereof are connected to the outputs of the PFC circuit and the signal detecting units to obtain the second DC power and receives the detecting signal, wherein the parallel and serial type DC to DC converter the second Dc power to a third DC power and physically changes a turn ratio of the primary and secondary coils of a transformer thereof according to a voltage ratio of the second DC power and the third DC power, wherein the turn ratio is in direct ratio to the voltage ratio.

2. The universal input switching power supply as claimed in claim 1, wherein the signal detecting unit comprises:
   a low pass filter connected to the output of the rectifier, wherein an output voltage of the low pass filter is changed according to the first DC power;
   a comparator having two inputs and an output, One of the two inputs connected to the low pass filter and the other input thereof is connected to a first referenced voltage, wherein the comparator compares the output voltage of the low pass filter and the first referenced voltage to output a DC signal with a continuous high and low potentials;
   an electronic switch having a controlling terminal connected to the output of the comparator;
   a voltage divider connected to the second DC power from the PFC circuit and having a first and second resistors connected together in serial, wherein a serial connecting node of the first and second resistors of the voltage divider is connected to the electronic switch of the signal detecting unit through a serial resistor, and one of the inputs of the PFC circuit is connected to the serial connecting node of the voltage divider.

3. The universal input switching power supply as claimed in claim 2, wherein the PFC circuit is a boost converter having:
   an inductor having two ends, one end thereof connected to the output of the rectifier;
   a storage capacitor connected to the other end of the inductor, a ground and the parallel and serial type DC to DC converter;
   a power switch connected between a connecting node of the inductor and the storage capacitor and the ground, and having a controlling terminal; and
   a PFC controller connected to the controlling terminal of the power switch and the signal detecting unit, and outputting a first PWM signal to the controlling terminal of the power switch, wherein the PFC controller has:
      an error amplifier having
         two input terminals, one of the two input terminals connected to a second referenced voltage and the other thereof connected to the serial connecting node of the voltage divider of the signal detecting unit; and
         an output terminal of the error amplifier connected to the voltage driver; and
      a driver connected to the controlling terminal of the power switch.

4. The universal input switching power supply as claimed in claim 2, wherein the PFC circuit is a buck converter having:

a power switch having
  a first terminal of the electronic switch connected to the output of the rectifier;
  a second terminal; and
  a controlling terminal;
an inductor having two ends, one of the two ends connected to a second terminal of the electronic switch;
a storage capacitor connected between the other of the inductor and the ground and supplied the second DC power source to parallel and serial type DC to DC converter;
a diode having:
  a cathode connected between the second terminal of the electronic switch and the inductor; and
  an anode thereof connected to the ground; and
a PFC controller connected to the controlling terminal of the electronic switch and the output terminal of the signal detecting unit, driving the electronic switch to turn on and off according to the detecting signal from the signal detecting unit, wherein the PFC controller has an error amplifier, a second referenced voltage and a switch driving unit, wherein two inputs of the error amplifier are respectively connected to the second referenced voltage and the serial connecting node of the voltage divider of the signal detecting unit.

5. The universal input switching power supply as claimed in claim 3, wherein the parallel and serial type DC to DC converter comprises:
  a central-tapped transformer having:
    a central-tapped primary coil having a first winding, a second winding and a central terminal; and
    a secondary coil outputting the third DC power through a rectifying and filtering circuit;
  a full bridge switching unit connected to the second DC power of the PFC circuit and having a first switching set and a second switching set connected to the first switching set in parallel, wherein each of the first and second switching sets has an upper switch and a lower switch connected to the upper switch in serial, wherein two serial connecting nodes of the first and second switching sets are respectively connected to two ends of the primary coil;
  a switch connected between the central terminal of the first coil and the ground of the second DC power;
  a PWM controller connected to the signal detecting unit and the controlling terminals of the upper and lower switches of the first and second switching sets.

6. The universal input switching power supply as claimed in claim 4, wherein the parallel and serial type DC to DC converter comprises:
  a central-tapped transformer having:
    a central-tapped primary coil having a first winding, a second winding and a central terminal; and
    a secondary coil outputting the third DC power through a rectifying and filtering circuit;
  a full bridge switching unit connected to the second DC power of the PFC circuit and having a first switching set and a second switching set connected to the first switching set in parallel, wherein each of the first and second switching sets has an upper switch and a lower switch connected to the upper switch in serial, wherein two serial connecting nodes of the first and second switching sets are respectively connected to two ends of the primary coil;
  a switch connected between the central terminal of the first coil and the ground of the second DC power;
  a PWM controller connected to the signal detecting unit and the controlling terminals of the upper and lower switches of the first and second switching sets.

7. The universal input switching power supply as claimed in claim 3, wherein the parallel and serial type DC to DC converter comprises:
  a central-tapped transformer having:
    a primary coil having a first winding and a second winding, wherein each of the first and second windings is connected to an inductor and a capacitor in serial; and
    a secondary coil outputting the third DC power through a rectifying and filtering circuit;
  a full bridge switching unit connected to the storage capacitor of the PFC circuit and having a first switching set and a second switching set connected to the first switching set in parallel, wherein each of the first and second switching sets has an upper switch and a lower switch connected to the upper switch in serial, wherein one end of the first winding is connected to a serial connecting node of the first switching set through the inductor and the capacitor, and the other end thereof is connected to a serial connecting node of the second switching set through a first electronic switch, wherein one end of the second winding is connected to the serial connecting node of the second switching set through the inductor and capacitor, and the other end thereof is connected to the ground;
  a second electronic switch connected between a connected node of the first winding and the first electronic switch and the ground;
  a PWM controller connected to the signal detecting unit and the controlling terminals of the upper and lower switches of the first and second switching sets, and driving the upper and lower switches to turn on and off according to the detecting signal from the signal detecting unit; and
  a processor connected to the signal detecting unit, the controlling terminals of the first and second electronic switches and a third referenced voltage, and having an inverter and a comparator having:
    two inputs respectively connected to the output terminal of the signal detecting unit and the third referenced voltage; and
    an output directly connected to the controlling terminal of the first electronic switch and connected to the controlling terminal of the second electronic switch through the inverter.

8. The universal input switching power supply as claimed in claim 3, wherein the parallel and serial type DC to DC converter comprises:
  a central-tapped transformer having:
    a primary coil having a first winding and a second winding, wherein each of the first and second windings is connected to an inductor and a capacitor in serial; and
    a secondary coil outputting the third DC power through a rectifying and filtering circuit;
  a full bridge switching unit connected to the storage capacitor of the PFC circuit and having a first switching set and a second switching set connected to the first switching set in parallel, wherein each of the first and second switching sets has an upper switch and a lower switch connected to the upper switch in serial, wherein one end of the first winding is connected to a serial connecting node of the first switching set through the inductor and the capacitor, and the other end thereof is connected to a serial connecting node of the second switching set through a first electronic switch, wherein one end of the second winding is connected to the serial connecting node of the second switching set through the inductor and capacitor, and the other end thereof is connected to the ground;

a second electronic switch connected between a connected node of the first winding and the first electronic switch and the ground;

a PWM controller connected to the signal detecting unit and the controlling terminals of the upper and lower switches of the first and second switching sets, and driving the upper and lower switches to turn on and off according to the detecting signal from the signal detecting unit; and a processor connected to the signal detecting unit, the controlling terminals of the first and second electronic switches and a third referenced voltage, and having an inverter and a comparator having:

two inputs respectively connected to the low power filter of the signal detecting unit and the third referenced voltage; and an output directly connected to the controlling terminal of the first electronic switch and connected to the controlling terminal of the second electronic switch through the inverter.

9. The universal input switching power supply as claimed in claim 5, wherein PWM controlling has an adjusting turn ratio procedure comprising steps of:

determining whether the voltage of the AC power is a high line voltage, wherein if a determining result is positive, a first PWM signal with 50% duty cycle is output to the controlling terminal of the upper switch of the first switching set, a second PWM signal with 50% duty cycle is output to the controlling terminal of the lower switch of the first switching set, the upper switch of the second switching set is turned off, the lower switch of the second switching set is turned on, and the switch is turned off, wherein the second PWM signal is a inverted PWM signal of the first PWM signal; and determining whether the voltage of the AC power is a low line voltage, wherein if a determining result is positive, the first PWM signal with 50% duty cycle is output to the controlling terminals of the upper switches of the first and second switching sets, the second PWM signal with 50% duty cycle to the controlling terminals of the lower switches of the first and second switching sets, and the switch is turned on, wherein the second PWM signal is a inverted PWM signal of the first PWM signal.

10. The universal input switching power supply as claimed in claim 6, wherein PWM controlling has an adjusting turn ratio procedure comprising steps of:

determining whether the voltage of the AC power is a high line voltage, wherein if a determining result is positive, a first PWM signal with 50% duty cycle is output to the controlling terminal of the upper switch of the first switching set, a second PWM signal with 50% duty cycle is output to the controlling terminal of the lower switch of the first switching set, the upper switch of the second switching set is turned off, the lower switch of the second switching set is turned on, and the switch is turned off, wherein the second PWM signal is a inverted PWM signal of the first PWM signal; and determining whether the voltage of the AC power is a low line voltage, wherein if a determining result is positive, the first PWM signal with 50% duty cycle is output to the controlling terminals of the upper switches of the first and second switching sets, the second PWM signal with 50% duty cycle to the controlling terminals of the lower switches of the first and second switching sets, and the switch is turned on, wherein the second PWM signal is a inverted PWM signal of the first PWM signal.

11. The universal input switching power supply as claimed in claim 7, wherein PWM controlling has an adjusting turn ratio procedure comprising steps of:

determining whether the voltage of the AC power is a high line voltage, wherein if a determining result is positive, a first PWM signal with 50% duty cycle is output to the controlling terminal of the upper switch of the first switching set, a second PWM signal with 50% duty cycle is output to the controlling terminal of the lower switch of the first switching set, the upper switch of the second switching set is turned off, the lower switch of the second switching set is turned on, the first electronic switch is turned on and the second electronic switch is turned off, wherein the second PWM signal is a inverted PWM signal of the first PWM signal; and determining whether the voltage of the AC power is a low line voltage, wherein if a determining result is positive, the first PWM signal with 50% duty cycle is output to the controlling terminals of the upper switches of the first and second switching sets, the second PWM signal with 50% duty cycle to the controlling terminals of the lower switches of the first and second switching sets, the first electronic switch is turned off and the second electronic switch is turned on, wherein the second PWM signal is a inverted PWM signal of the first PWM signal.

12. The universal input switching power supply as claimed in claim 8, wherein PWM controlling has a adjusting turn ratio procedure comprising steps of:

determining whether the voltage of the AC power is a high line voltage, wherein if a determining result is positive, a first PWM signal with 50% duty cycle is output to the controlling terminal of the upper switch of the first switching set, a second PWM signal with 50% duty cycle is output to the controlling terminal of the lower switch of the first switching set, the upper switch of the second switching set is turned off, the lower switch of the second switching set is turned on, the first electronic switch is turned on and the second electronic switch is turned off, wherein the second PWM signal is a inverted PWM signal of the first PWM signal; and determining whether the voltage of the AC power is a low line voltage, wherein if a determining result is positive, the first PWM signal with 50% duty cycle is output to the controlling terminals of the upper switches of the first and second switching sets, the second PWM signal with 50% duty cycle to the controlling terminals of the lower switches of the first and second switching sets, the first electronic switch is turned off and the second electronic switch is turned on, wherein the second PWM signal is a inverted PWM signal of the first PWM signal.

13. The universal input switching power supply as claimed in claim 5, wherein each of the upper and lower switches is MOSFET or IGBT.

14. The universal input switching power supply as claimed in claim 6, wherein each of the upper and lower switches is MOSFET or IGBT.

15. The universal input switching power supply as claimed in claim 7, wherein each of the upper and lower switches is MOSFET or IGBT.

16. The universal input switching power supply as claimed in claim 8, wherein each of the upper and lower switches is MOSFET or IGBT.

17. The universal input switching power supply as claimed in claim 5, wherein the switch of the parallel and serial type DC to DC converter is relay.

18. The universal input switching power supply as claimed in claim 6, wherein the switch of the parallel and serial type DC to DC converter is relay.

19. The universal input switching power supply as claimed in claim 6, wherein each of the first and second switch of the parallel and serial type DC to DC converter is relay.

20. The universal input switching power supply as claimed in claim 7, wherein each of the first and second switch of the parallel and serial type DC to DC converter is relay.

* * * * *